United States Patent [19]

Urata et al.

[11] Patent Number: 5,339,010

[45] Date of Patent: Aug. 16, 1994

[54] COLOR CATHODE-RAY TUBE APPARATUS

[75] Inventors: Hiroshi Urata, Fukaya; Toshinao Sone, Kumagaya; Kazunori Nakane, Saitama; Kazunori Satou; Kiyoshi Tokita, both of Fukaya, all of Japan

[73] Assignee: Kabushiki Kaisha Toshiba, Kawasaki, Japan

[21] Appl. No.: 37,536

[22] Filed: Mar. 26, 1993

Related U.S. Application Data

[63] Continuation of Ser. No. 731,041, Jul. 17, 1991, abandoned.

[30] Foreign Application Priority Data

Jul. 17, 1990 [JP] Japan .................. 2-188236

[51] Int. Cl.⁵ .............................................. H01J 29/51
[52] U.S. Cl. ............................................... 315/368.17
[58] Field of Search ................. 315/368.11, 368.12, 315/368.17

[56] References Cited

U.S. PATENT DOCUMENTS

| | | |
|---|---|---|
| 3,638,065 | 1/1972 | Ueno . |
| 3,975,766 | 8/1976 | Sano et al. .................. 315/368.17 |
| 4,342,029 | 7/1982 | Hofmanis et al. ............ 340/703 |
| 4,849,676 | 7/1989 | Morohashi .................... 315/368.17 |

FOREIGN PATENT DOCUMENTS

| | | |
|---|---|---|
| 2327766 | 12/1973 | Fed. Rep. of Germany . |
| 49-11462 | 1/1974 | Japan . |
| 49-128629 | 12/1974 | Japan . |
| 62-43040 | 2/1987 | Japan . |

Primary Examiner—Theodore M. Blum
Attorney, Agent, or Firm—Cushman, Darby & Cushman

[57] ABSTRACT

A color cathode-ray tube apparatus comprising a video signal generator, a delay circuit, an electron gun assembly, a deflection yoke, a shadow mask, and a phosphor screen. The signal generator generates three video signals simultaneously. The delay circuit delays the first and second video signals with respect to the third video signal. The screen has phosphor elements regularly arranged. The electron gun assembly generates three electron beams at different times, in response to the three signals output by the delay means. These beams are applied to the phosphor screen, and the phosphor elements of the screen emit red light, green light and blue light. Any three electron beams the gun assembly emits simultaneously form three beam spots on the screen. These spots overlap for a distance longer than half the horizontal diameter of a beam spot formed by an electron beam of the greatest current which the gun assembly can generate. The shadow mask, located between the phosphor screen and the gun assembly, controls the beams, making them land at desired positions on the phosphor screen. The deflection yoke deflects the beams in the horizontal and vertical directions, such that the electron beams scan the entire screen. The beams, deflected in the horizontal direction, land at substantially the same point on the screen, forming a color pixel thereon.

6 Claims, 13 Drawing Sheets

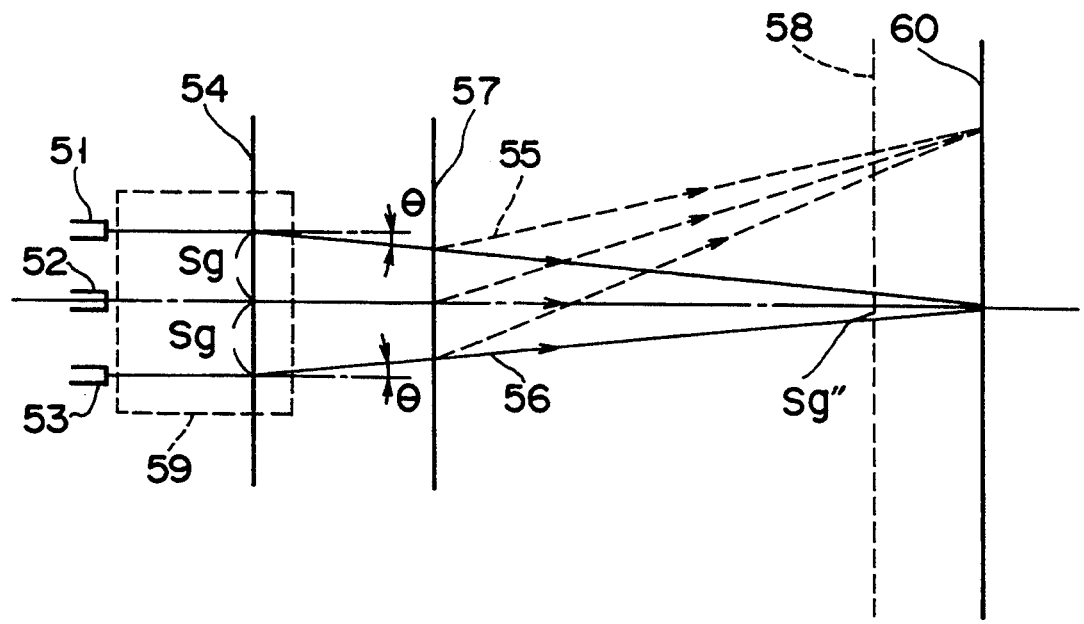
F I G. 6
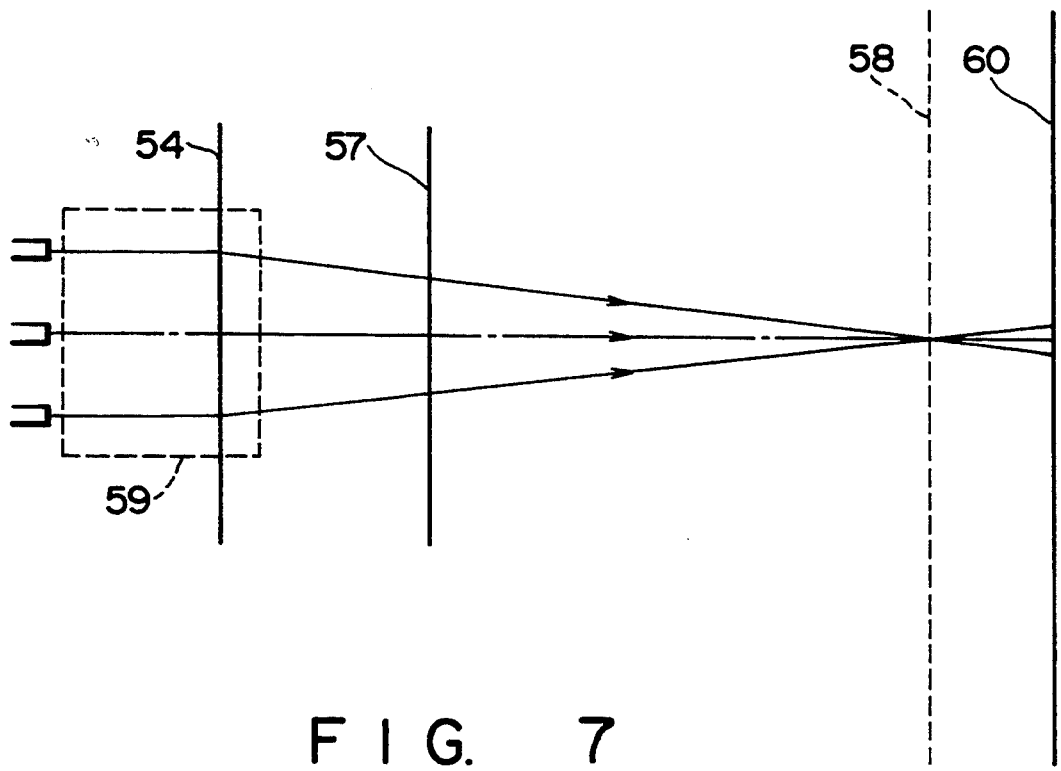
F I G. 7

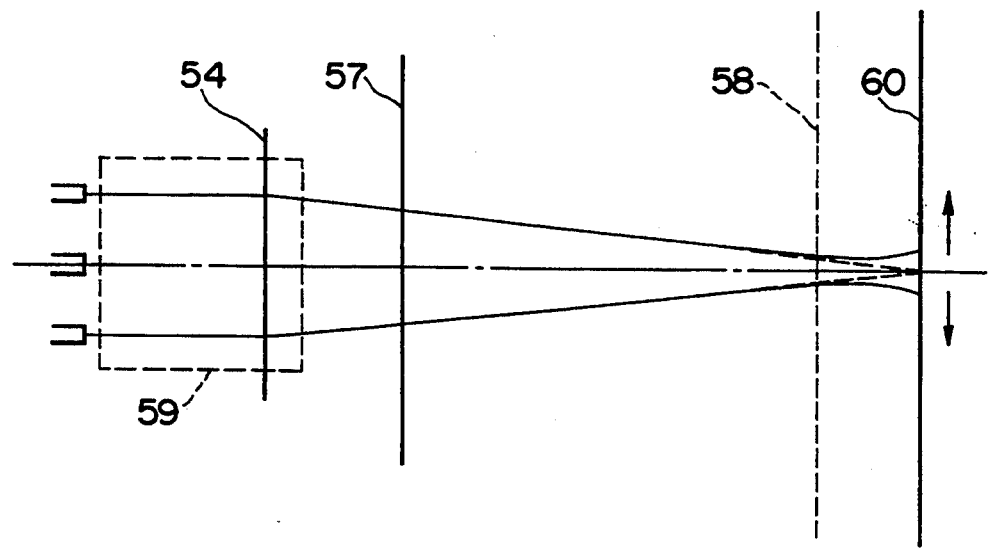
F I G. 8
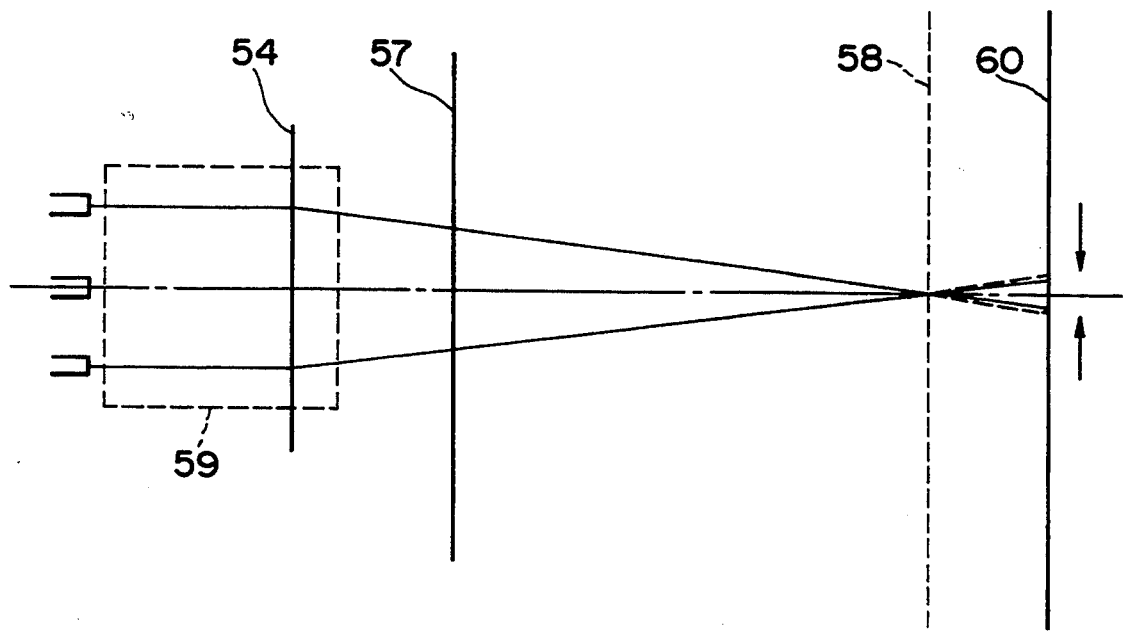
F I G. 9

DIRECTION OF HORIZONTAL SCANNING

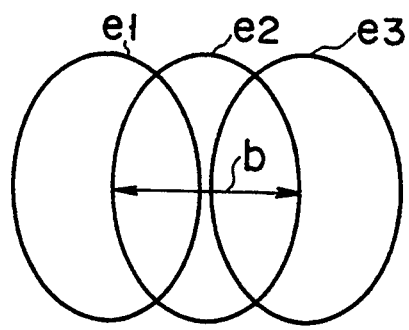
F I G. 17
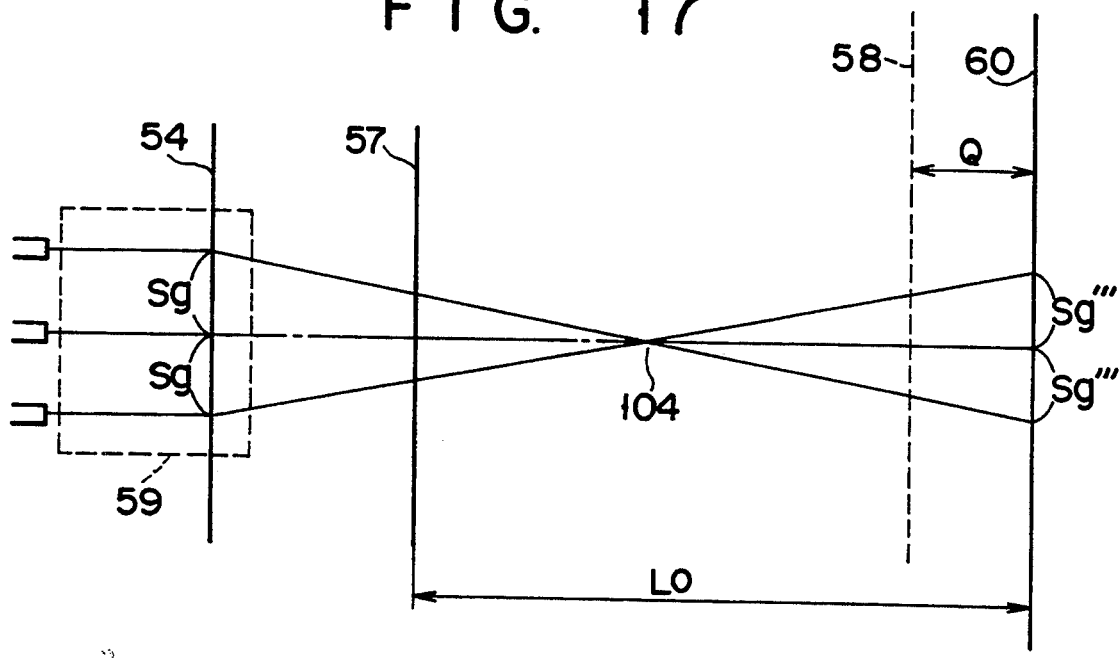
F I G. 18
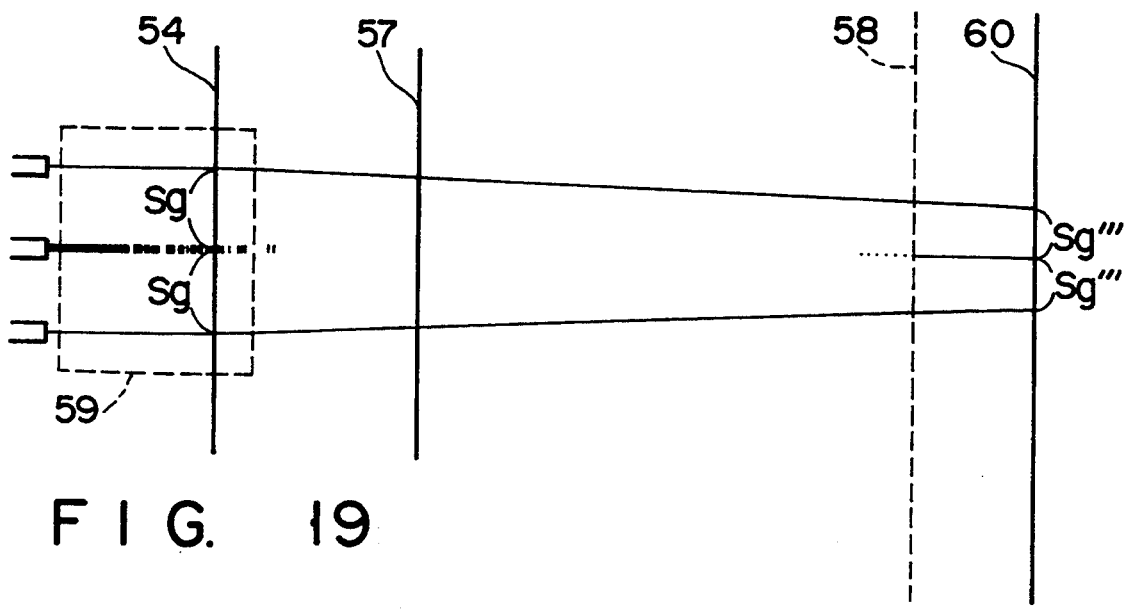
F I G. 19

COLOR CATHODE-RAY TUBE APPARATUS

This is a continuation of application Ser. No. 07/731,041, filed on Jul. 17, 1991, which was abandoned upon the filing hereof.

BACKGROUND OF THE INVENTION

1. Field of the Invention

The present invention relates to a color cathode-ray tube apparatus and, more particularly, to a color cathode-ray tube apparatus which excels in convergence characteristic.

2. Description of the Prior Art

FIG. 1 shows an ordinary color cathode-ray tube which has been known hitherto. As is evident from this figure, the tube (i.e., main component) of the color cathode-ray apparatus comprises a panel 3 having a phosphor screen 2, a funnel 4 coupled to the panel 3, and a neck 5 extending from the funnel 4.

The neck 5 contains an electron gun assembly 6 for generating electron beams. A deflection yoke 7 is on the outer peripheries of the junction of the funnel 4 and the neck 5. The panel 3 and the funnel 4, connected to each other, form an envelope. Within the envelope, a frame 10 holds a shadow mask 9 having a number of apertures 8, such that the shadow mask 9 is spaced apart from the phosphor screen 2 by a predetermined distance. A magnetic shield 11 is secured to the frame 10. An inner electroconductive layer 12 is coated on the inner surface of the funnel 4 and also on the inner surface of the front portion of the neck 5. An outer electroconductive layer 13 is coated on the outer surface of the funnel 4. Anode terminals (not shown) are connected to the funnel 4. Outside the envelope, a drive-signal generating circuit 14 is located for applying an appropriate voltage to the electron gun assembly 6 and to an anode electrode, and for supplying drive signals to the deflection yoke 7.

The phosphor screen 2 consists of red-light emitting phosphor elements, green-light emitting phosphor elements, and blue-light emitting phosphor elements—all either stripes or dots, formed on the inner surface of the panel 3. The electron gun assembly 6 comprises a beam-shaping unit and an electron lens unit. The beam-shaping unit generates three parallel electron beams $B_R$, $B_G$ and $B_B$, adjusts the shapes of these beams, and accelerates them. The electron lens unit converges or focuses each of three beams. The deflection yoke 7 applies a magnetic field to the beams $B_R$, $B_G$ and $B_B$ emitted from the electron gun assembly 6. The deflected electron beams pass through the shadow mask 9 and land on a red-light emitting phosphor element, a green-light emitting phosphor element, and a blue-light emitting phosphor element, respectively. Excited with the beams, the phosphor elements emit red light, green light, and blue light. In other words, the deflected electron beams $B_R$, $B_G$ and $B_B$ scan the phosphor screen 2, whereby the screen 2 displays a color image.

The deflection yoke 7 has a horizontal deflection coil for generating a magnetic field which deflects electron beams in the horizontal direction, and a vertical deflection coil for generating a magnetic field which deflects electron beams in the vertical direction.

The phosphor screen 2 can be either an in-line stripe type shown in FIG. 2A or a delta dot type shown in FIG. 2B. As is shown in FIG. 2A, the in-line stripe screen has a number of parallel black strips 21 and groups of parallel phosphor strips coated among the black strips 21, each group consisting of a red-light emitting strip 22, a green-light emitting strip 23, and a blue-light emitting strip 24. As is shown in FIG. 2B, the delta dot screen has a black layer 21 having round openings, and groups of phosphor dots formed in the openings of the layer 21, each group made of a red-light emitting dot 22, a green-light emitting dot 23, and a blue-light emitting dot 24. Whichever type the screen 2 is, it cannot form a color image having high color purity or high brightness, unless three electron beams 25, 26, and 27 correctly land on the phosphor strips or dots 22, 23, and 24, respectively.

In recent years, more and more phosphor elements are formed in unit area to form high-quality color images, and more light each phosphor element is required to emit to form bright color images. Hence, the margin for erroneous beam landing cannot help but be limited. This margin limited, it is now necessary to minimize even the erroneous beam landing caused by mutual repulsion of electron beams, which is far less than the erroneous beam landing resulting from excessive or insufficient beam deflection.

SUMMARY OF THE INVENTION

The object of the present invention is to provide a color cathode-ray tube apparatus, wherein the erroneous beam landing resulting from mutual expulsion of electron beams is reduced, thereby to form high-quality color images.

According to the present invention, there is provided a color cathode-ray tube apparatus which comprises:

video signal generating means for generating a first, a second, and a third video signal;

delay means for delaying the first and second video signal generated by the video signal generating means, by different periods of time, with respect to the third video signal;

a phosphor screen having phosphor elements for emitting red light, phosphor elements for emitting green light, and phosphor elements for emitting blue light, which are regularly arranged in horizontal and vertical directions of the screen;

electron beam generating means for generating a first, a second, and a third electron beam in response to the first, second and third video signals supplied from the delay means, respectively, and applying the first, second and third electron beams to the phosphor screen, thereby to cause the phosphor elements to emit red light, green light and blue light, three electron beams simultaneously generated by the electron beam generating means forming three beam spots on the phosphor screen which overlaps for a distance longer than half the horizontal diameter of a beam spot formed by an electron beam of the greatest current which the electron beam generating means is able to generate;

beam controlling means located between the phosphor screen and the electron beam generating means, for controlling the first, second and third electron beams such that the electron beams land at desired positions on the phosphor screen; and deflection means for deflecting the first, second and third electron beams in the horizontal and vertical directions, such that the electron beams scan the phosphor screen in both horizontal direction and the vertical direction, the electron beams deflected in the horizontal direction landing at substantially the same point on the phosphor screen, thereby to form a color pixel thereon.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a schematic diagram showing how three electron beams converge at one point on the inner surface of the front panel of the apparatus shown in FIG. 3;

FIG. 7 is a diagram explaining how three electron beams converge at one point on the shadow mask of the apparatus shown in FIG. 3;

FIGS. 8 and 9 show how three electron beams repel one another;

FIG. 17 explains how erroneous beam landing results from the mutual repulsion of the electron beams emitted by a delta-dot type electron gun assembly;

FIG. 18 is a diagram showing three electron beams deflected excessively;

FIG. 19 is a diagram showing three electron beams which are made to converge insufficiently in order to reduce the mutual expulsion of the beams.

DETAILED DESCRIPTION OF THE PREFERRED EMBODIMENTS

A color cathode-ray tube apparatus 1 according to the present invention will now be described, with reference to the accompanying drawings.

Figure 1:
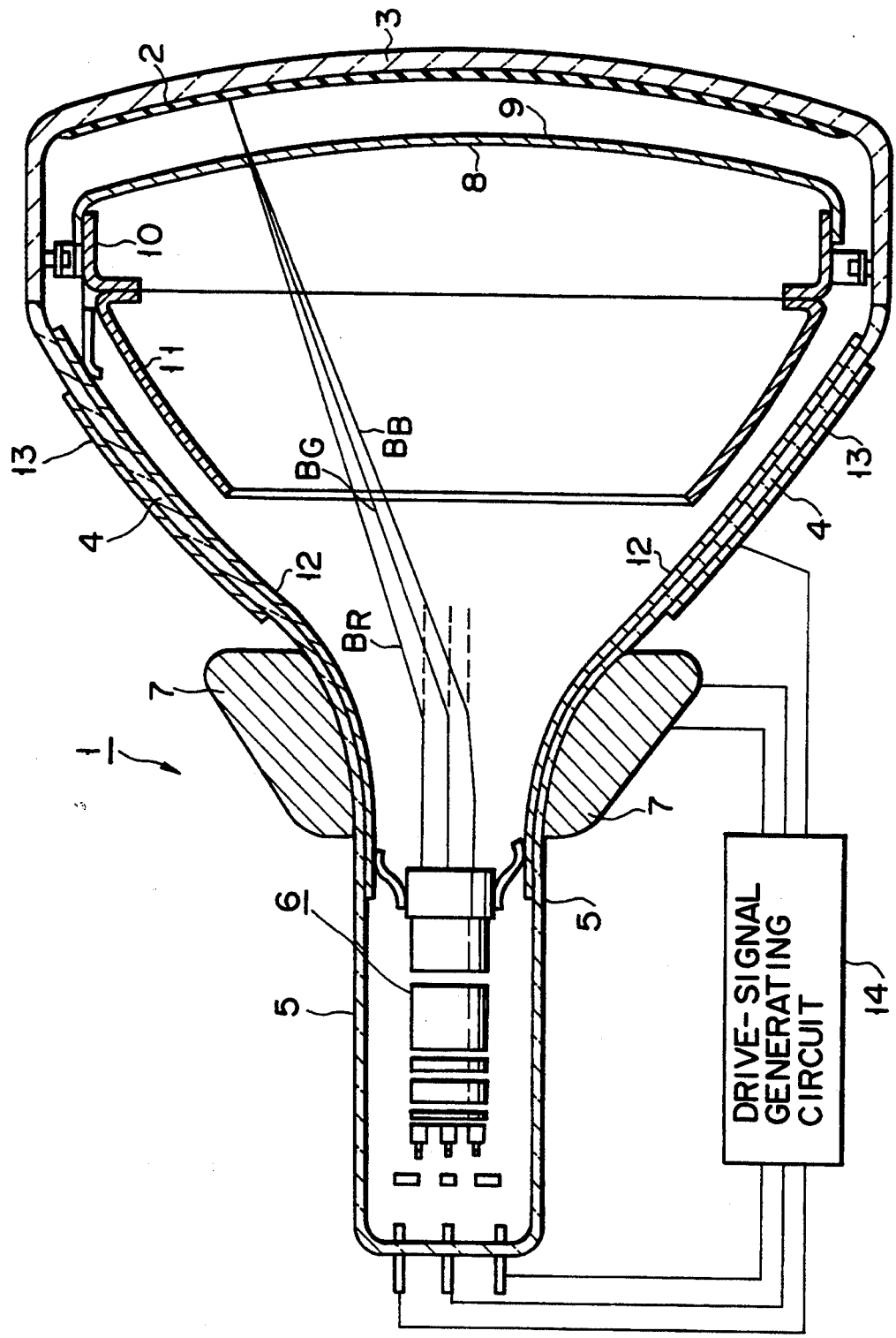
FIG. 1 is a cross-sectional view schematically showing a conventional color cathode-ray tube apparatus.
Figure 2A:
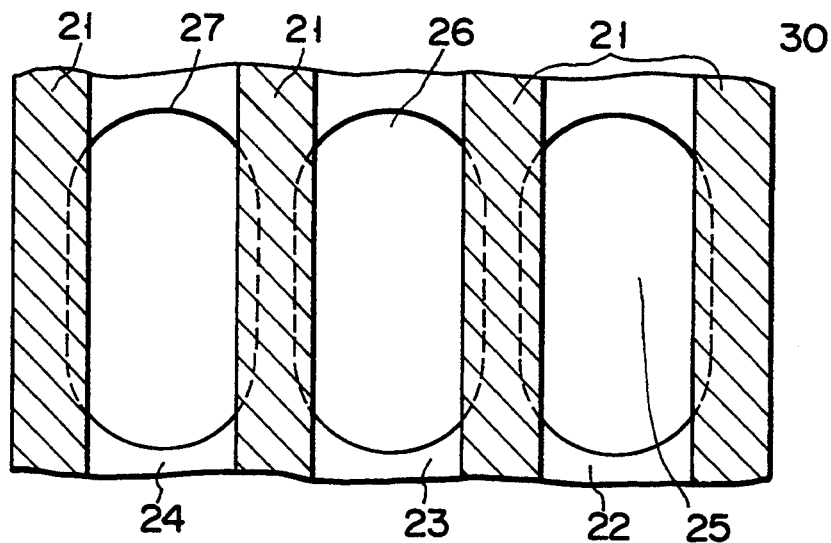
FIG. 2A is a plan view showing a part of an in-line stripe screen which can be used in the apparatus shown in FIG. 1, illustrating how the electron beams land on the screen in normal condition.
Figure 2B:
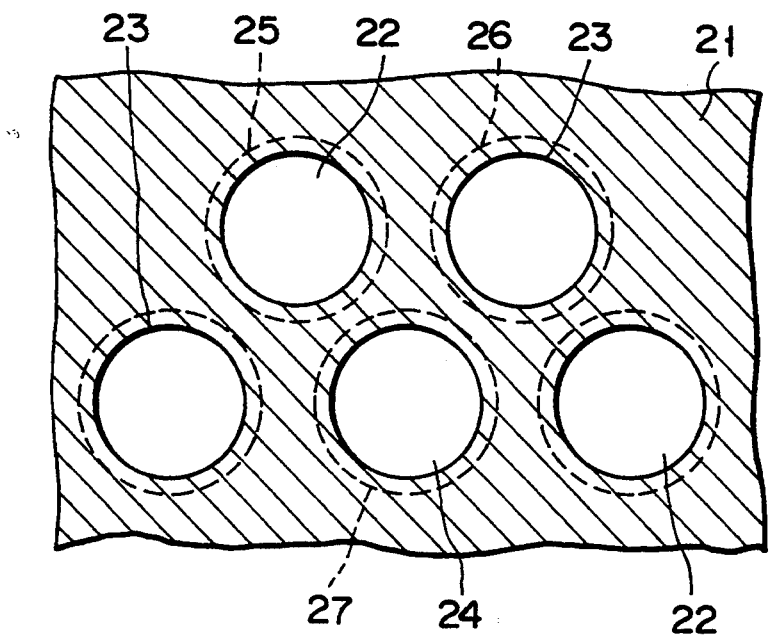
FIG. 2B is also a plan view showing a part of a delta dot screen which can be incorporated in the apparatus shown in FIG. 1, explaining how the electron beams land on the screen in normal condition.
Figure 3:
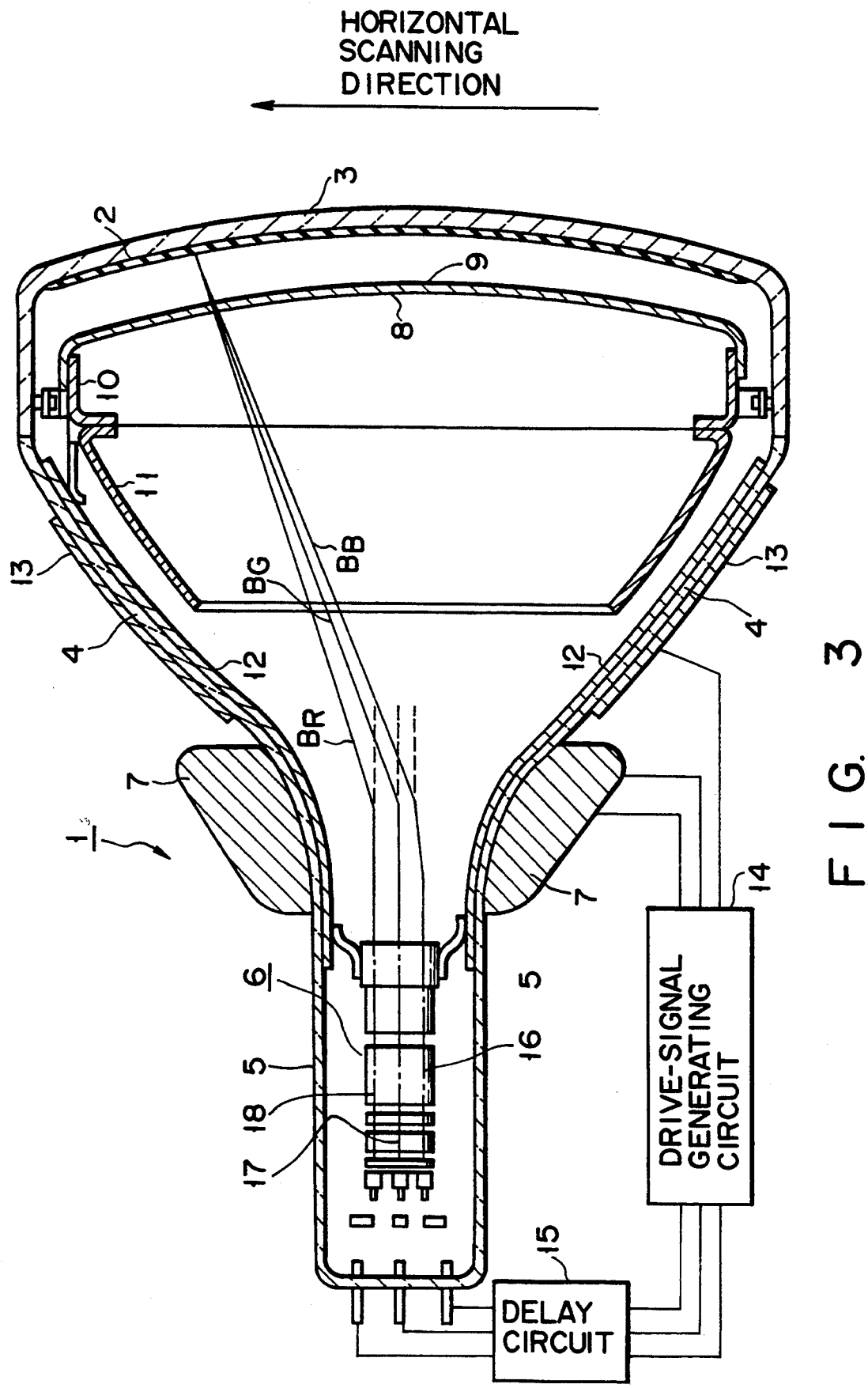
FIG. 3 is a cross-sectional view schematically showing a color cathode-ray tube apparatus according to the present invention.

FIG. 3 is a cross-sectional view of the apparatus 1, taken along a horizontal plane containing the axis of the cathode-ray tube. The apparatus is similar in structure to the apparatus shown in FIG. 1. Its main component, i.e., the color cathode-ray tube comprises a panel 3 having a phosphor screen 2, a funnel 4 coupled to the panel 3, and a neck 5 extending from the funnel 4. The neck 5 contains an electron gun assembly 6 for generating electron beams. A deflection yoke 7 is mounted on the outer peripheries of the Junction of the funnel 4 and the neck 5. Within the tube, a frame 10 holds a shadow mask 9 having a number of apertures 8, such that the shadow mask 9 is spaced apart from the phosphor screen 2 by a predetermined distance. A magnetic shield 11 is secured to the frame 10. An inner electroconductive layer 12 is coated on the inner surface of the funnel 4 and also on the inner surface of the front portion of the neck 5. An outer electroconductive layer 13 is coated on the outer surface of the funnel 4. Anode terminals (not shown) are connected to the funnel 4.

The phosphor screen 2 is, for example, an in-line stripe type. It has a number of parallel black strips and groups of parallel phosphor strips coated among the black strips, each group consisting of a redlight emitting strip, a green-light emitting strip, and a blue-light emitting strip. The electron beams $B_R$, $B_G$ and $B_B$ emitted from the gun assembly 6 pass through the shadow mask 8 and land on the red-light emitting phosphor strip, the green-light emitting phosphor strip, and the blue-light emitting phosphor strip, respectively. Excited with the beams, the phosphor strips emit red light, green light, and blue light.

The electron gun assembly 6 is of in-line type. It comprises a beam-shaping unit and an electron lens unit. The beam-shaping unit generates three parallel electron beams $B_R$, $B_G$ and $B_B$, adjusts the shapes of these beams, and accelerates them. The electron lens unit converges or focuses each of three beams. The beam-shaping unit has three electron guns 16, 17 and 18, arranged side by side in the same plane. The gun 16, hereinafter called "blue electron gun," emits an electron beam to excite the blue-light emitting phosphor strips. The gun 17, hereinafter referred to as called "green electron gun," emits an electron beam to excite the green-light emitting phosphor strips. The gun 18, hereinafter called "red electron gun," emits an electron beam to excite the red-light emitting phosphor strips.

The deflection yoke 7 has a horizontal deflection coil for generating a magnetic field which deflects electron beams in the horizontal direction, and a vertical deflection coil for generating a magnetic field which deflects electron beams in the vertical direction.

Outside the color cathode-ray tube, a drive-signal generating circuit 14 is located for applying an appropriate voltage on the electron gun assembly 6 and to an anode electrode, and for supplying drive signals to the deflection yoke 7. Also outside the tube, a delay circuit 15 is connected between the circuit 14 and three stems for applying signal voltages to the gun assembly 6.

The delay circuit 15 delays two of the three drive signals simultaneously output by the circuit 15. More precisely, the circuit 15 delays the first input drive signal by time $2\tau$, outputting a blue-gun drive signal; it delays the second input drive signal by time $\tau$, outputting a green-gun drive signal; it does not delay the third input drive signal, outputting a red-gun drive signal. The blue-gun drive signal, the green-gun drive signal, and the red-gun drive signal are supplied to the electron guns 16, 17, and 18, respectively. Hence, the electron guns 16, 17, and 18 emits three electron beams, each with a time lag of $\tau$ with respect to the preceding one.

Both deflection coils of the deflection yoke 7 apply magnetic fields to the beams $B_B$, $B_G$ and $B_R$ emitted from the electron guns 16, 17, and 18, deflecting these beams in the horizontal direction as is shown in FIG. 3, and also in the vertical direction. The deflected electron beams pass through the shadow mask 9 and land on a red-light emitting phosphor element, a green-light emitting phosphor element, and a blue-light emitting phosphor element, respectively. Excited with the beams, the phosphor elements emit red light, green light, and blue light. In other words, the deflected electron beams scan the phosphor screen 2, whereby the screen 2 displays a color image.

Since the three electron beams are emitted from the gun assembly 6, one after another, not simultaneously, they do not repel one another. Yet they can be applied to the blue-light emitting phosphor strip, the green-light emitting phosphor strip, and the red-light phosphor strip which are located side by side. Hence, erroneous landing of the electron beams can be prevented.

To facilitate the operating principle of the color cathode-ray tube apparatus shown in FIG. 3, it will be explained how three electron beams repel one another in the conventional apparatus, inevitably causing erroneous landing of the electron beams.

Figure 4A:
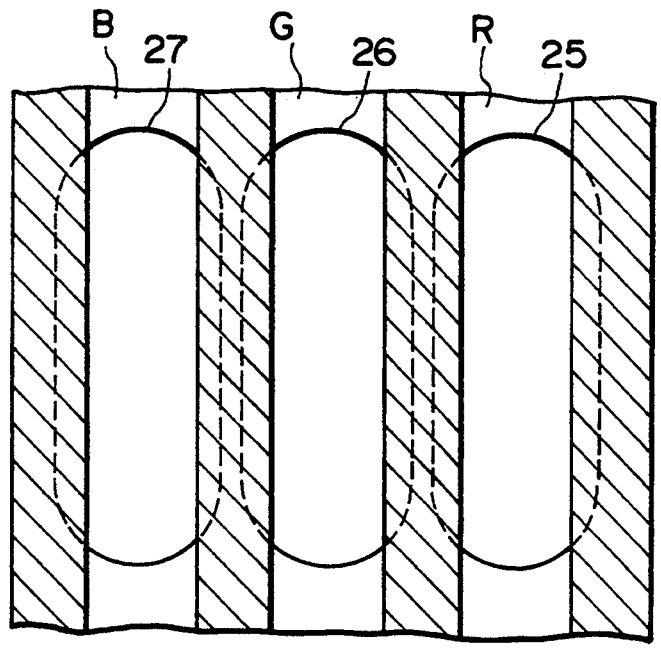
FIGS. 4A and 4B and FIGS. 5A to 5C are diagrams explaining how erroneous beam landing occurs on an in-line stripe phosphor screen.

In normal condition, three electron beams 25, 26, and 27 land on the phosphor screen 2, forming three oblate spots having their long axes substantially aligned with the axes of the phosphor strips R, G, and B, respectively, as is shown in FIG. 4A. When the current for each beam increases, the beams 25 and 27 shift toward the beam 26. This shift of the beams 25 and 27 can be attributed to mutual repulsion of the electron beams 25, 26, as will be explained in the following several paragraphs.

Figure 5A:
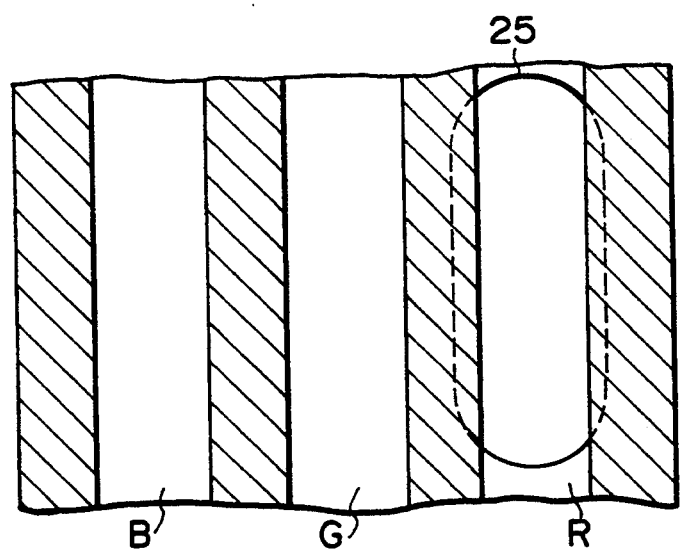
Figure 5B:
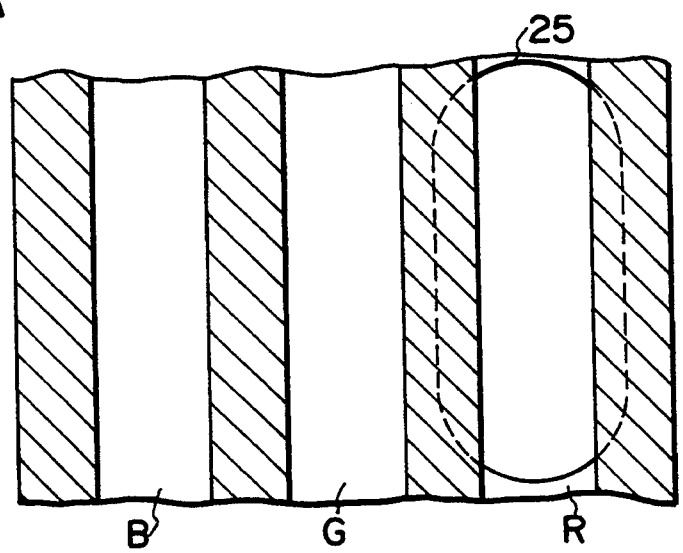
Figure 5C:
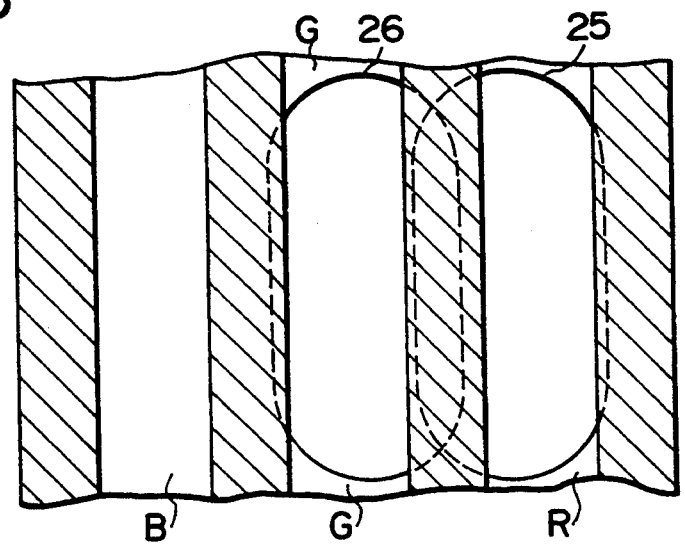

When the electron gun assembly 6 emits the electron beam 25 only, it lands on the phosphor strip R correctly as is shown in FIG. 5A. If the current for the beam 25 increases in this condition, nothing will happen, but the beam spot expands horizontally as is shown in FIG. 5B. When the gun assembly 6 emits two beams 25 and 26 simultaneously, and the currents for these beams increase, not only will the resultant beam spots expand horizontally, but the beam 25 will also move toward the beam 26, ultimately overlapping the beam 26, as is shown in FIG. 5C.

This phenomenon can be explained as follows. FIG. 6 illustrates how three electron beams emitted from the cathode electrodes 51, 52 and 53 incorporated in an electron gun assembly 6 are deflected such that they correctly land on three phosphor strips R, G and B of the screen 60. First, the electron beams pass through an electrode unit 59. Then, the main lens 54 deflects the side beams toward the center beam by angle $\theta$, so that all beams may land correctly on the strips R, G and B of the screen 60 even if they are not deflected further while passing through the deflection region. (Thus, the main lens 54 converges the beams to make them land correctly on the strips R, G and B of the phosphor screen 60.) Then, the three beams enter the deflection region, where they are gradually deflected and each travel in a curving path. For simplicity, it is assumed that the beams are deflected at the plane 57 and travel in straight paths (in broken lines), as is shown in FIG. 6.

In actual operation, the three beams are deflected such that they converge at a point on a shadow mask 58 as is shown in FIG. 7. Then, they diverge from each other as they travel from the mask 58 to the phosphor screen 60. Precisely speaking, the three electron beams do not reach the screen 60 at the same time; the side beams reach the screen 60 later than the center beam by a period proportional to the distance Sg" for which either side beam deviates from the center beam at the shadow mask 58.

As is known in the art, any two electron beams simultaneously emitted repel each other. The nearer they are, the more greatly they repel each other. Therefore, in the case where the side beams are deflected at the plane 57 such that they and the center beam land correctly on the phosphor strips R, G and B of the screen 60, the side beams travel from the mask 58 to the phosphor screen 60 along flaring paths indicated by the solid lines in FIG. 8. They should travel along straight paths indicated by the broken lines in FIG. 8, if the three beams did not repel one another.

Figure 4B:
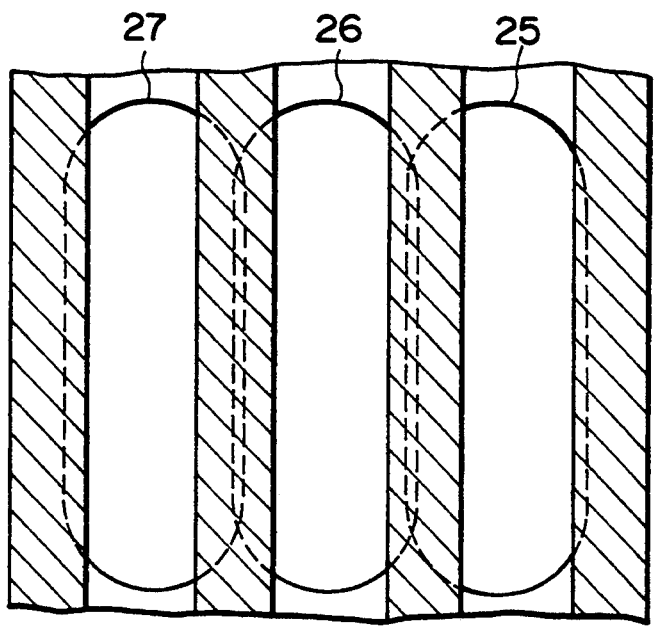

On the other hand, in the case where the three beams are deflected at the plane 57 such that they converge at the same aperture of the shadow mask 58 as is shown in FIG. 9, the side beams do not travel from the mask 58 to the screen 60 in the paths indicated by the broken lines. Rather, they approach each other while traveling from the mask 58 to the screen 60, as is indicated by the solid lines. As a result, the three beams land the red-light emitting strips R, G and B as is shown in FIG. 4B. This is because the three beams repel each other while traveling toward the shadow mask 58, and the side beams approach each other due to the inertia of the electrons forming them.

There are two possible methods of reducing the erroneous beam landing resulting from the mutual repulsion of the three electron beams. These methods will be explained, with reference to FIGS. 10A and 10B.

Figure 10A:
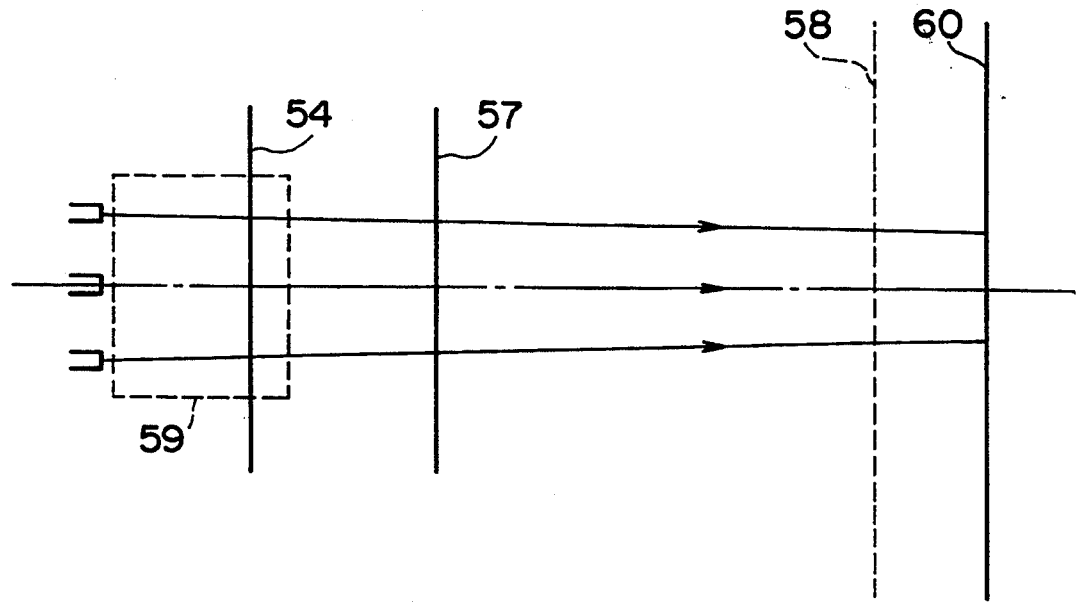
FIGS. 10A and 10B show three electron beams deflected insufficiently, and three electron beams deflected excessively, respectively.
Figure 10B:
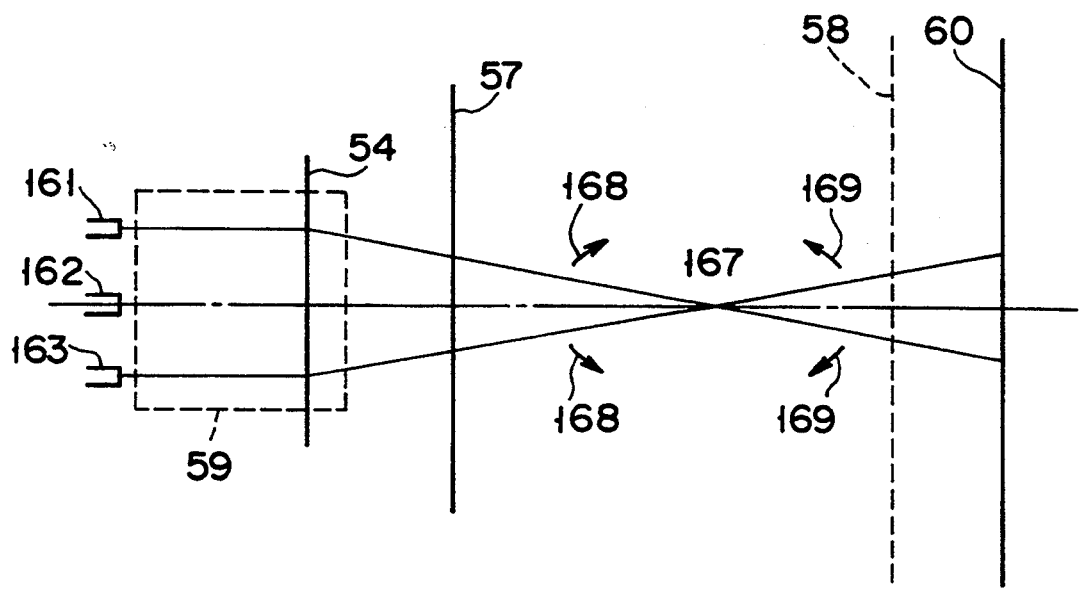

The first method is to deflect the three electron beams insufficiently at the plane 57, so that the they do not converge at all and land on the phosphor strips R, G and B of the screen 60 as is shown in FIG. 10A. The second method is to deflect the three electron beams excessively at the plane 57, so that they converge at a point 167 shortly before reaching the mask 58 and thence diverge from each other, as is shown in FIG. 10B.

In the first method, the beams are spaced apart from each other all the way they travel from the plane 57 to the screen 60. Hence, the repulsion force each beam exerts on the other two is weak since the force is inversely proportional to the square of the distance between the beam and any other beam.

In the second method, the beams emitted by electron guns 161, 162 and 163 repel one another as they approach the point 167. Hence, both side beams deviate away from the center beam, in the directions of arrows 168, as they travel toward the point 167. Further, the three beams repel another as they further travel from the point 167 toward the shadow mask 58, whereby both side beams deviate away from the center beam, in the directions 169. As a result, the three beams travel from the mask 58 to the screen 60 along the same path as if they did not repel another. In other words, the repulsion of the beams traveling to the point 167 cancels out the repulsion of the beams traveling from the point 167 to the shadow mask 58. Therefore, even if the three electron beams are deflected excessively at the plane 57, erroneous beam landing can be prevented, despite the mutual repulsion of the electron beams.

Strictly speaking, the first method, wherein the three electron beams are deflected insufficiently at the plane 57, cannot eliminate the erroneous beam landing resulting from the mutual repulsion of the beams, but can reduce the erroneous beam landing to some extent. By contrast, the second method, wherein the electron beams are deflected excessively at the plane 57, can completely cancel the erroneous beam landing resulting from the mutual repulsion of the beams, provided the point 167 is properly positioned where the beams join together. In the second method, however, if the beams are deflected even more, thus converging at a point located nearer the plane 57 than the point 167, they repel one another more greatly while traveling from the point 167 to the screen 60 than while traveling from the plane 57 to the point 167, whereby the side-beam spots inevitably deviate from the center-beam spot on the phosphor screen 60.

As can be understood from the above, both methods can indeed control the erroneous beam landing resulting from the mutual repulsion of beams, but neither can reduce the erroneous beam landing to nil. Thus, whichever method is used, it is impossible to form high-quality color images on the phosphor screen 60.

In the present invention, the delay circuit 15 receives the three drive signals simultaneously output by the drive-signal generating circuit 14, delays two of the three signals by two different periods, and supplies three drive signals to the electron gun assembly 6 at different times. Therefore, the gun assembly 6 emits three electron beams at different times, not at the same time. The technique of emitting three electron beams at different times enables the beams to land correctly on the phosphor strips R, G and B of the screen 60, as will be explained with reference to FIGS. 11 and 12.

In most color cathode-ray tubes, not only NTSC-type ones, but also PAL-type and HD-type ones, the three electron beams are deflected horizontally, thereby scanning the screen 60 from the left to the right. An in-line type electron gun assembly, commonly incorporated in the color cathode-ray tubes, has three electron guns which are arranged parallel in a horizontal plane containing the axis of the tube.

Figure 11:
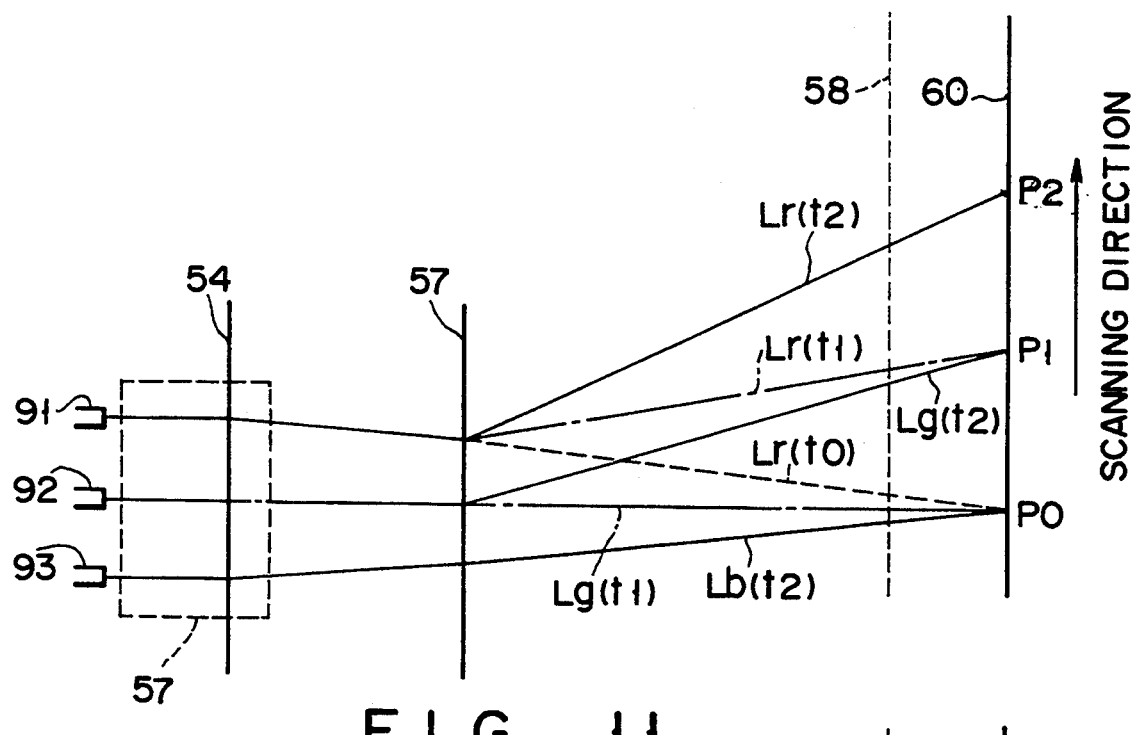
FIG. 11 illustrates how two of three electron beams are deflected to scan the screen in a specific condition.

With reference to FIG. 11, it will be described how three electron beams are emitted at different times by the three electron guns 91, 92 and 93 of an in-line type gun assembly, and are then deflected sufficiently, thereby to land correctly on the phosphor strips R, G and B of the screen 60.

As is shown in FIG. 11, the electron gun 91 emits an electron beam at time t0. This beam is deflected by the main lens 54 and at the plane 57 and travels along a path Lr(t0) to a point P0 on the screen 60. Next, at time t1, the electron gun 92 emits an electron beam, which beam is deflected neither by the lens 54 and at the plane 57 and travels to the point P0 along a path Lg(t1). At time t1, too, the gun 91 emits another electron beam, which is deflected by the lens 54 and at the plane 57 and travels along a path Lr(t1) to a point P1 on the screen 60. Then, at time t2, the electron tun 93 emits an electron beam, which is deflected by the lens 54 and at the plane 57 and travels to the point P1 along a path Lb(t2). At time t2, too, the gun 91 emits another beam, which is deflected by the lens 54 and at the plane 57 and travels along a path Lr(t2) to a point P2 on the screen 60; and the gun 92 emits another beam, which is deflected neither by the lens 54 and at the plane 57 and travels to point P1 along a path Lg(t2). Since the three beams to apply to substantially the same point on the screen 60 are emitted at different times t0, t1, and t2, they do not travel very close to one another and, hence, do not repel one another. Therefore, they converge at substantially the same point on the screen 60, correctly landing on the phosphor strips R, G and B. To achieve this successful beam landing, the delay circuit 15 only needs to delay the drive signal to the gun 92 by the period of (t1–t0), and to delay the drive signal to the gun 93 by the period of (t2–t0).

Now, with reference to FIG. 12, it will be described how three electron beams are emitted at different times by the three electron guns 91, 92 and 93 of an in-line type gun assembly, and are then deflected excessively, thereby to land correctly on the phosphor strips R, G and B of the screen 60.

Figure 12:
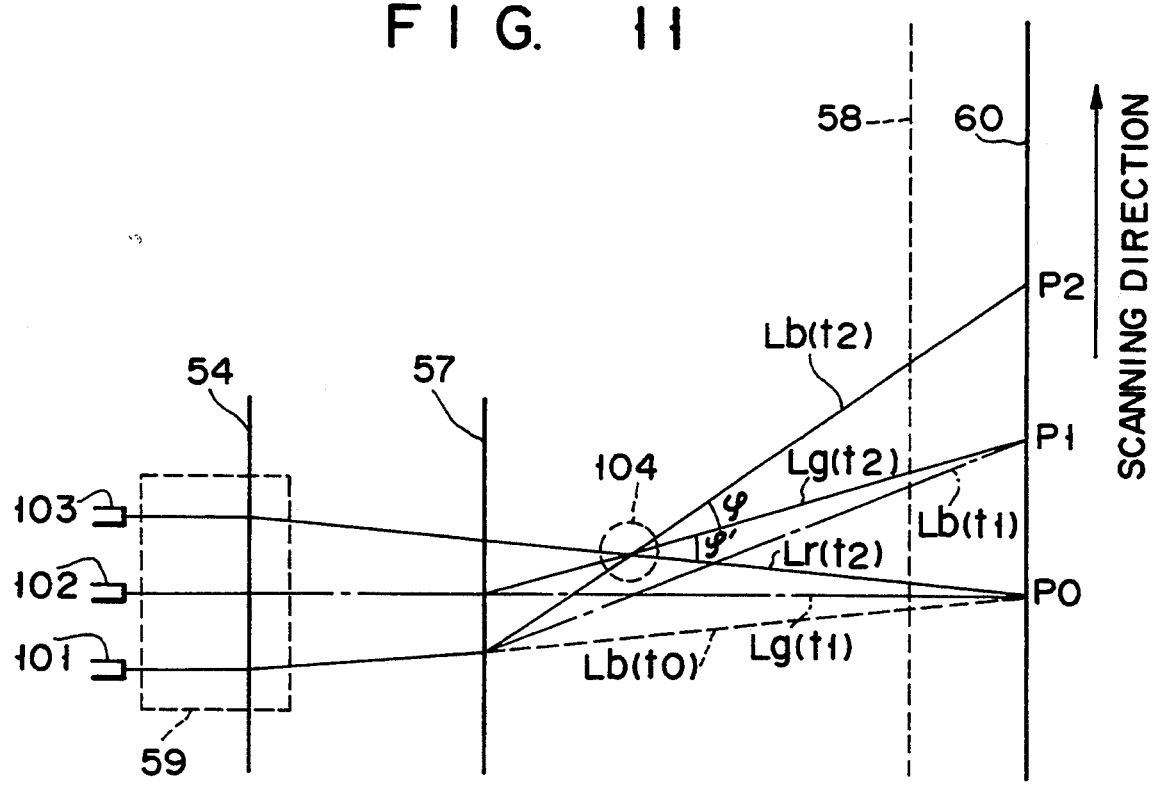
FIG. 12 shows how two of three electron beams are deflected to scan the screen in a specific condition.
Figure 13:
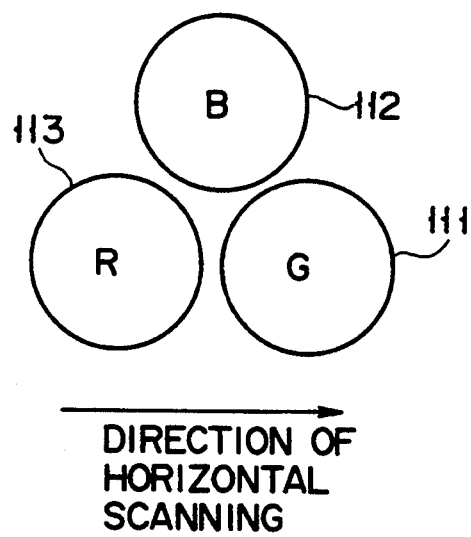
FIG. 13 is a diagram illustrating the position relation of the three electron beams emitted by a delta-dot type electron gun assembly which can be used in the apparatus of FIG. 3.

As is evident from FIG. 12, the electron gun 101 emits an electron beam at time t0. This beam is deflected by the main lens 54 and travels along a path Lb(t0) to a point P0 on the screen 60. Next, at time t1, the electron gun 102 emits an electron beam, which is not deflected by the lens 54 and travels to point P0 along a path Lg(t1). Also at time t1, the gun 101 emits another beam, which is deflected by the lens 54 and at the plane 57 and travels along a path Lb(t1) to a point P1 on the phosphor screen 60. Next, at time t2, the electron gun 103 emits an electron beam, which is deflected by the lens 54 and at the plane 57 and travels to the point P0 along a path Lr(t2). At time t2, too, the gun 101 emits another beam, which is deflected by the lens 54 and at the plane 57 and travels along a path Lb(t2) to a point P2 on the screen 60; and the gun 102 also emits another beam, which is deflected only at the plane 57 and travels to the point P1 along a path Lg(t2). The three beams, which the guns 101, 102 and 103 emit at time t2, converge at point 104 and then travel to the points P2, P1 and P0 respectively. By contrast, the three beams, which the guns 101, 102 and 103 emits at time t0, time t1 and time t0, respectively, do not travel very close to one another and, hence, do not repel one another. Hence, they converge at substantially the same point, i.e., the point P0, on the screen 60, correctly landing on the phosphor strips R, G and B. To achieve this successful beam landing, the delay circuit 15 only needs to delay the drive signal to the gun 102 by the period of (t1–t0), and to delay the drive signal to the gun 103 by the period of (t2–t0).

Both methods of achieving correct beam landing, described above with reference to FIGS. 11 and 12, can be applied to a color cathode-ray tube which has a delta-type electron gun assembly, a known type other than the in-line electron gun assembly. More specifically, when the three electron beams emitted by the delta-type electron gun assembly are excessively deflected and converge before reaching the shadow mask, it suffices to emit a blue electron beam 112 with a time delay of $\tau$ with respect to a red electron beam 113, and to emit a green electron beam 111 with a time delay of 2τ with respect to the beam 113. To emit the beams 111, 112 and 113 at different times, the green-image signal and the blue-image signal must be delayed by periods τ and 2τ, respectively, with respect to the red-image signal. If the green- and blue-image signals are delayed too much, they will deformed too prominently. In view of this, it is required that the misconvergence, i.e. overconvergence or underconvergence of the three beams emitted at the same time from the three electron guns is appropriately determined.

Figure 14:
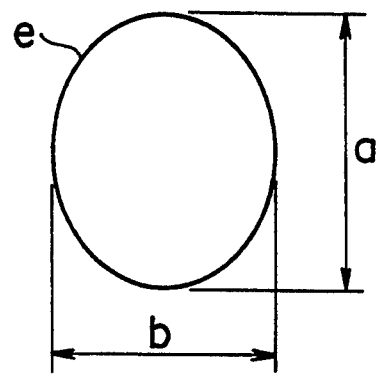
FIG. 14 is a diagram representing the shape of a beam spot formed on the inner surface of the front panel of the apparatus shown in FIG. 3.
Figure 15:
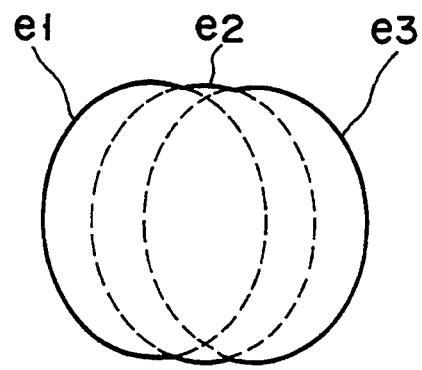
FIG. 15 is a diagram explaining how three electron beams overlap.

In a color cathode-ray tube of the type shown in FIG. 6, the three electron beams simultaneously emitted from the main lens 54 of the electron gun assembly 59 travel along paths which converge at substantially the same point on the screen 60. The distance Sg among the beams at the main lens 54 ranges 4 mm to 7 mm in most cases. The yoke 7 deflects the beams at the plane 57 at such angles that the beams are spaced apart at the shadow mask 58 by a distance Sg" which ranges from 0.2 mm to 0.6 mm. Each electron beam forms an elliptical spot on the screen 60. As is shown in FIG. 14, the beam spot has a vertical diameter a and a horizontal diameter b. As is known in the art, the greater the beam current, the larger the beam spot. The size of the beam spot depends also on the size of the cathode-ray tube. Table 1 shows the relation between the axes a and b, on the one hand, and the beam current, on the other, in a 28-inch, 110°-deflection angle tube.

TABLE 1

| Beam Current | Axis a | Axis b |
| --- | --- | --- |
| 0.1 mA | 0.8 mm | 0.8 mm |
| 1.0 mA | 1.4 mm | 0.8 mm |
| 3.0 mA | 3.0 mm | 2.0 mm |
| 5.0 mA | 4.5 mm | 3.5 mm |

Figure 16:
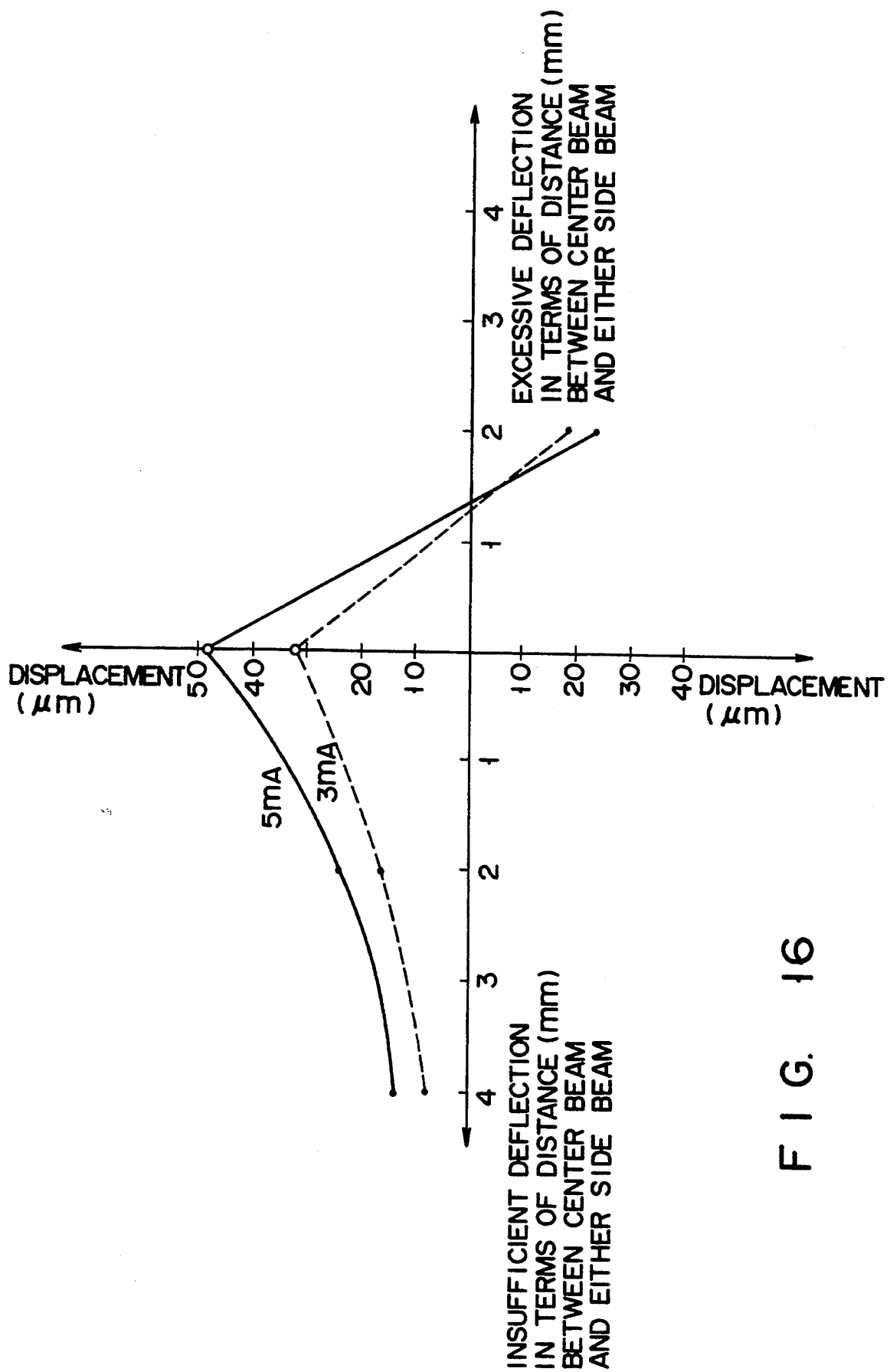
FIG. 16 is a graph, explaining the operating characteristics of the color cathode-ray tube apparatus shown in FIG. 3.

The mutual repulsion of the electron beams grows more acute as the beams emitted from the main lens 54 approach one another. It decreases as the beams diverge from one another. The inventors hereof conducted experiments to determine the erroneous beam landing in terms of displacement of the side beams. In the experiments, NTSC signals were supplied to a 28-inch, 110°-deflection angle tube, and a voltage of 29 KV was applied to the anode electrode of the tube. The results were as is represented in FIG. 16, wherein the side-beam deflection is plotted on the x axis in terms of the distance (mm) between the side beams, and the displacement (μm) of either beam toward the center beam is plotted on the y axis. In FIG. 16, the broken curve indicates the relation which the distance between the side beams and the displacement of the side beams have when the beam current was 3 mA, whereas the solid curve indicates the relation which the distance and the displacement have when the beam current was 5 mA.

As is evident from FIG. 16, the larger the beam current, the greater the mutual repulsion of the beams. The greater the repulsion, the more should the side beams be deflected excessively or insufficiently. In the case of insufficient deflection, the displacement of either side beam was 10 μm or less when the distance between the side beams was 4 mm or more. In the case of excessive deflection, either side beam moved toward the center beam when the distance between the side beams was about 1.5 mm or less, moved away from the center beam when the distance was more than about 1.5 mm, and did not move when the distance was about 1.5 mm.

As Table 1 shows, the beam spot has a horizontal diameter b of 3.5 mm when the beam current is 5 mA. Hence, when the side beams are insufficiently deflected, the beam posts e1, e2 and e3 may overlap on the screen 60 as is shown in FIG. 17. To prevent this overlapping, it suffices to deflect both side beams such that the side-beam spots e1 and e3 move away from the center-beam spot e2 for a distance of 1.75 mm, i.e., half the horizontal diameter b of the center-beam spot e2. On the other hand, when the side beams are excessively deflected, the displacement of either side beam can reduced more than in the case of insufficient deflection, provided the distance between the side beams is about 1.5 mm. This is because the beam repulsion of the beams, occurring as the beams travel to a converging point, suppresses the beam repulsion as the beams travel toward the screen. Hence, it is unnecessary to deflect the side beams such that the side-beam spots e1 and e3 move away from the center-beam spot e2 for, preferably, about a quarter of the vertical diameter b, no so a long distance as is required in the case of insufficient beam deflection.

As can be understood from the experimental results shown in FIG. 16, it is possible with the present invention to reduce the erroneous beam landing resulting from the mutual repulsion of the three electron beams.

In the present invention, three electron beams for forming a color pixel on the phosphor screen are not simultaneously emitted, or deflected insufficiently or excessively. Rather, they are emitted at different times and deflected to substantially the same point on the phosphor screen.

As is known in the art, an NTSC-type color cathode-ray tube has a horizontal-scanning frequency of 15.75 KHz, and a 28-inch NTSC-type tube has a phosphor screen about 530 mm wide. In order to set the insufficiently deflected side beams apart from each other for a distance of 4 mm on the phosphor screen, the second side beam must be emitted upon lapse of about 0.48 μS (t2-t0) from the time the first side beam is emitted. Hence, the three beams must be emitted, each with a delay of 0.24 μS with respect to the preceding beam. On the other hand, to set the excessively deflected side beams apart from each other for a distance of 1.5 mm on the phosphor screen, the second side beam must be emitted upon lapse of about 0.18 μS (t2-t0) from the time the first side beam is emitted; the three beams must be emitted, each with a delay of 0.09 μS with respect to the preceding beam.

Obviously, the three electron beams can be converged substantially at the same point on the screen more accurately when they are deflected excessively than whey they are deflected insufficiently. The erroneous beam landing resulting from the mutual repulsion of the beams can, therefore, be reduced to almost nil when the beams are deflected excessively. Nonetheless, insufficient deflection is advantageous in the following respects.

Generally, the horizontal deflection magnetic field generated by a deflection yoke is, in most cases, a pincushion magnetic field which renders the beams convergence-free and prevents vertical deforming of an image. When the electron beams, emitted at different times by virtue of the delay circuit 15, are insufficiently deflected with the pin-cushion horizontal-deflection magnetic field, the beam spots formed on the outer portions of the screen are spaced apart 1.3 times to 2 times greater than those beam formed on the center portion of the screen. More precisely, in a 28-inch, 110°-deflection angle tube, the side-beam spots formed on outer portions of the screen are spaced by 1.2 mm to 4.0 mm, whereas the side-beam spots formed on the center portion of the screen are spaced by 4 mm. As a result, a high-quality image can be formed on the phosphor screen. The distance between the side-beam spots formed on the outer portions can easily be increased to 4 mm, merely by decreasing the intensity of the pincushion magnetic field, making the field more intensity-uniform.

The distance among the three beam spots formed on the phosphor screen is proportional to the magnitude of mutual repulsion of the beams. The relation between the distance and the magnitude of repulsion will be explained, with reference to FIG. 18.

As can be understood from FIG. 18, the magnitude of the beam repulsion depends on the anode voltage, the beam current, the distance Sg between the beams in the gun assembly 59, and the distance LO between the deflection plane 57 and the phosphor screen 60, and the displacement of each beam, resulting from the mutual repulsion of the beams depends on the distance Q between the shadow mask 58 and the phosphor screen 60. As is evident from FIG. 18, the beam are excessively deflected and converge at point 104 located between the plane 57 and the mask 58. They are spaced apart at the screen 60 by a distance $Sg'''$, and none of the beams is displaced at all on the screen 60, irrespective of the beam current. This is because the repulsion of the beams traveling to the point 104 cancels out the repulsion of the beams traveling from the point 104 to the shadow mask 58. In this case, neither the anode voltage nor the beam current influences the distance $Sg'''$.

The distance $Sg'''$, by which the beam spots on the screen 60 are spaced apart when the beams are deflected excessively, is inversely proportional to the distance Sg by which the beams are spaced in the electron gun assembly 59. Namely:

$$Sg''' \propto 1/Sg \quad (1)$$

The distance $Sg'''$ is proportional to the distance LO and also to the distance Q. Namely:

$$Sg''' \propto LO \quad (2)$$

$$Sg''' \propto Q \quad (3)$$

From formulas (1), (2) and (3), the distance $Sg'''$ is given as:

$$Sg''' = (K \, LO \, Q)/Sg \quad (4)$$

The distances LO, Sg, Q and $Sg'''$ and the coefficient of proportion K were measured for a 28-inch, 110°-deflection angle tube, and also for a 32-inch, 110°-deflection angle tube and a 25-inch, 110°-deflection angle tube. The distances and the proportion coefficients, measured, were as is shown in Table 2:

TABLE 2

|  | 28" 110° | 32" 110° | 25" 110° |
|---|---|---|---|
| LO | 268.5 mm | 314.4 mm | 238.8 mm |
| Sg | 6.6 mm | 6.6 mm | 6.6 mm |
| Q | 13.3 mm | 17.15 mm | 11.88 mm |
| Sg''' | 0.65 mm | 0.96 mm | 0.48 mm |
| K | $1.20 \times 10^{-3}$ | $1.17 \times 10^{-3}$ | $1.12 \times 10^{-3}$ |

As Table 2 shows, the average value for the coefficient K is $1.16 \times 10^{-3}$. In order to obtain an appropriate value for $Sg'''$, it suffices to substitute this average value of $1.16 \times 10^{-3}$ for K in equation (4).

No problems will arise if the displacement of either side-beam spot is 20 μm or less in, for example, the 28-inch, 100°-deflection angle tube, as can be understood from the graph of FIG. 16. It follows that $Sg'''$ should be somewhere between 0.3 mm to 1.0 mm. In this case, K ranges from $0.55 \times 10^{-3}$ to $1.85 \times 10^{-3}$. Hence, when the electron beams are deflected excessively, K should be set at $0.55 \times 10^{-3}$ to $1.85 \times 10^{-3}$ as is evident from equation (4).

When the electron beams are deflected insufficiently, both the anode voltage nor the beam current influence the distance $Sg'''$. In other words, the magnitude of the beam repulsion depends on more parameters than in the case where the beams are deflected excessively.

However much the beams are spaced apart from one another, they electrically repel one another, and it is impossible to eliminate the displacement of either side-beam spot. Nonetheless, this displacement can be reduced to a value which does not deteriorate the quality of the resultant color image. The maximum allowable displacement of either side-beam spot is about half the horizontal diameter of each beam spot. In the 28-inch, 100°-deflection angle tube, for instance, the horizontal diameter of each beam spot is 3.5 mm when the beam current is 5 mA (See Table 1). In this case, the distance between the side-beam spots is 3.5 mm. The size of each beam spot formed on the screen 60 accords with the beam current and the size of the tube. The video signals, delayed so long, have their waveforms deformed, resulting in an decrease of image sharpness. Hence, in the case of insufficient beam deflection, the overlapping of the beam spots must be reduced to half or less of the horizontal diameter of each spot, and the distance $Sg'''$ must be less than the distance Sg, as is shown in FIG. 19.

In the case of a 28-inch, 110°-deflection angle color cathode-ray tube, the beam spots formed on the phosphor screen have a horizontal diameter of about 3.5 mm. Hence, it is necessary to deflect electron beams insufficiently such that either side-beam spot overlaps the center-beam spot for about 1.7 mm. The beams should therefore be emitted, each with a delay of 0.24 μs with respect to the preceding beam in the NTSC system in which jumping scanning is performed, and a delay of 0.12 μs in the EDTV system in which the deflection-scanning frequency is twice as high as in the NTSC system. The electron gun assembly emits three electron beams at different times, each with a delay of 0.24 μs or 0.12° μs. These beams are insufficiently deflected, and travel along the paths shown in FIG. 11 toward the phosphor screen at different times, until they reach substantially the same point on the screen at different times. Since the beams do not converge at all, they do not repel one another.

Alternatively, in the 28-inch, 110°-deflection angle color cathode-ray tube, it is necessary to deflect electron beams excessively such that either side-beam spot overlaps the center-beam spot for about 0.7 mm. The delay circuit must, therefore, delay the green-image signal and the blue-image signal must be delayed by periods τ and 2τ, respectively, with respect to the red-image signal. The delay τ is 0.09 μs in the NTSC system in which jumping scanning is performed, and is 0.05° μs in the EDTV system in which the deflection-scanning frequency is twice as high as in the NTSC system. The electron gun assembly emits three electron beams at different times, each with a delay of 0.09 μs or 0.05° μs. The beams are excessively deflected, and travel along the paths shown in FIG. 12 toward the phosphor screen at different times, until they reach substantially the same point on the screen at different times. Since the beams do not converge at all, they do not repel one another.

Figure 20:
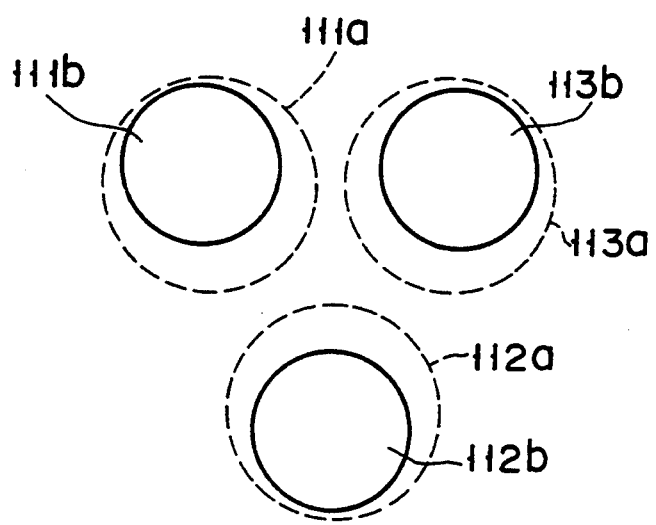
FIG. 20 is a diagram for qualitatively explaining the essence of the present invention.

The present invention can be applied to a color cathode-ray tube which has a delta-type electron gun assembly. The three electron beams emitted from the delta-type electron gun assembly and then deflected form three spots 111a, 112a and 113a on the phosphor screen, as is shown in FIG. 20. Whether the beams are deflected insufficiently or excessively, the beam spots 111a, 112a and 113a are not concentric with the red-light emitting dot 111b, the blue-light emitting dot 112b, and the green-light emitting dot 113b formed on the screen, respectively. Rather, as is evident form FIG. 20, the beam spots 111a, 112a, and 113a are shifted toward the center of the 3-phosphor dot pattern. In most color cathode-ray tube, the dot 113b is first scanned, then the dot 112b, and finally the 111b. Hence, the delay circuit must delay the blue-image signal and the green-image signal must be delayed by periods $\tau$ and $2\tau$, respectively, with respect to the red-image signal.

If the cathode-ray tube is a 28-inch, 110°-deflection angle tube, wherein beam spots on the screen have a horizontal diameter of about 3.5 mm, the delta-type gun assembly must emit three electron beams, each with a delay of 0.24 μs or 0.12 μs with respect to the preceding beam, and the beams must be deflected insufficiently such that either side-beam spot overlaps the center-beam spot for about 1.7 mm.

As has been described, the present invention can provide a color cathode-ray tube apparatus, wherein the erroneous beam landing resulting from mutual expulsion of electron beams is reduced, thereby forming high-quality color images.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color cathode-ray tube apparatus comprising:
   a phosphor screen having a plurality of trios, each of which define one color picture element in a horizontal direction, each of said trios consisting of first, second and third phosphor elements, arranged in a horizontal direction, for emitting red, green and blue light rays, respectively;
   means for generating first, second and third video signals, each of which correspond to one of said trios and have first, second and third video signal components;
   means for delaying said first and second video signal components by different periods of time with respect to said third video signal component;
   electron beam generating means for simultaneously generating a first, a second, and a third electron beam in response to said first, second and third video signals, wherein each of said first, second and third electron beams have first, second and third beam components, respectively, which are modulated for one of said plurality of trios in response to said first, second and third video signal components from said delay means, respectively;
   means for converging said first, second and third electron beams at a convergent point located between said phosphor screen and said electron beam generating means, and for applying said first, second and third electron beams diverged from said converging point to said first, second and third phosphor elements of different trios, respectively, thereby causing said phosphor elements to emit red, green and blue light rays, respectively, wherein a first repelling force acting on said first, second and third electron beams traveling from said electron beam generating means to said convergent point being substantially canceled by a second repelling force acting of said first, second and third electron beams traveling from said converging point to said phosphor screen; and
   means for deflecting said first, second and third electron beams in a horizontal and vertical direction so as to allow said first, second and third phosphor elements of said different trios to be scanned with said first, second and third beam components of said first, second and third electron beams at different times, respectively.

2. The apparatus according to claim 1, further including a shadow mask located at a predetermined distance from said phosphor screen on a electron beam generating means side and a deflecting plane defined by said deflecting means; wherein
   said first, second and third electron beams simultaneously generated by said electron beam generating means are spaced apart from one another by a distance $Sg'''$ on said phosphor screen, which is given as:

$$Sg''' = (K\ LO\ QO)/Sg$$

where LO is the distance (mm) between said deflection plane and said phosphor screen, Q is the distance (mm) between said shadow mask and said phosphor screen, Sg is the distance (mm) between any adjacent two of the three electron beams from said electron beam generating means, and K is a coefficient of proportion which is greater than $0.55*10^{-3}$ and less than $1.85*10^{-3}$.

3. The apparatus according to claim 1, wherein said electron beam generating means includes three electron guns for generating said first, a second, and a third electron beam, respectively, which are parallel and extend in a same horizontal plane.

4. The apparatus according to claim 1, wherein said electron beam generating means includes electron guns for generating electron beams which are parallel and form three beam spots on said phosphor screen, which are located at the apexes of an equilateral triangle.

5. The apparatus according to claim 1, wherein said electron beam generating means includes means for focusing said first, second and third electron beams to form beam spots having a diameter within a maximum horizontal diameter on said phosphor screen, said beam spots overlapping for a distance longer than half said maximum horizontal diameter of said beam spot.

6. The apparatus according to claim 1, wherein said delay means applies a first, a second and a third delay to said first, second and third video signal components, respectively, said second delay being smaller than said first delay and said third delay being smaller than said second delay, so that said first, second and third electron beam components converge on said phosphor screen.

* * * * *